Patented Feb. 27, 1940

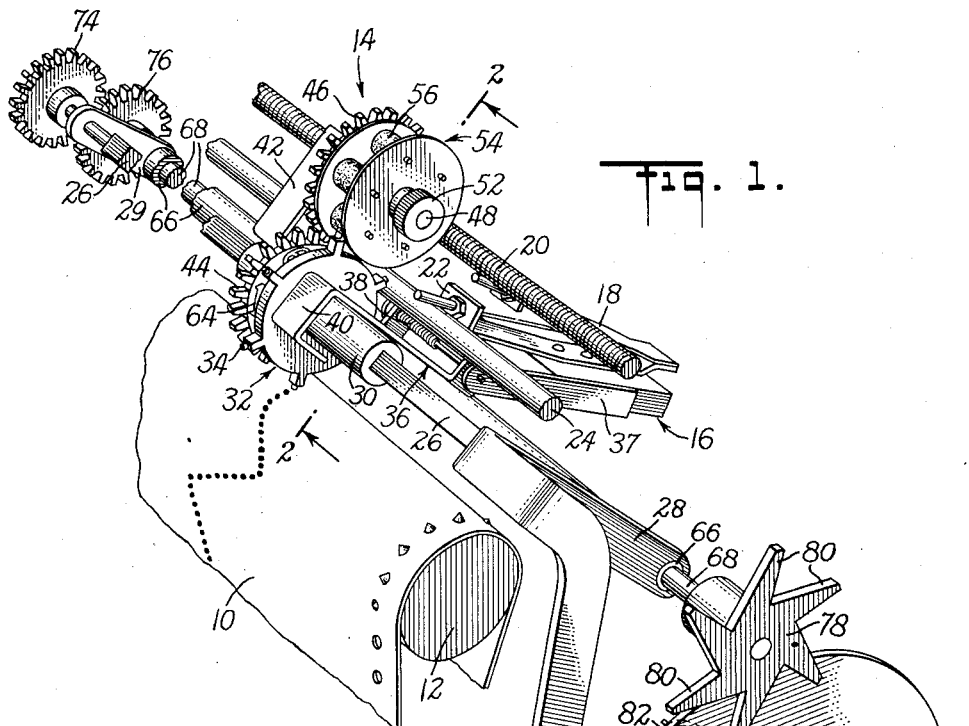
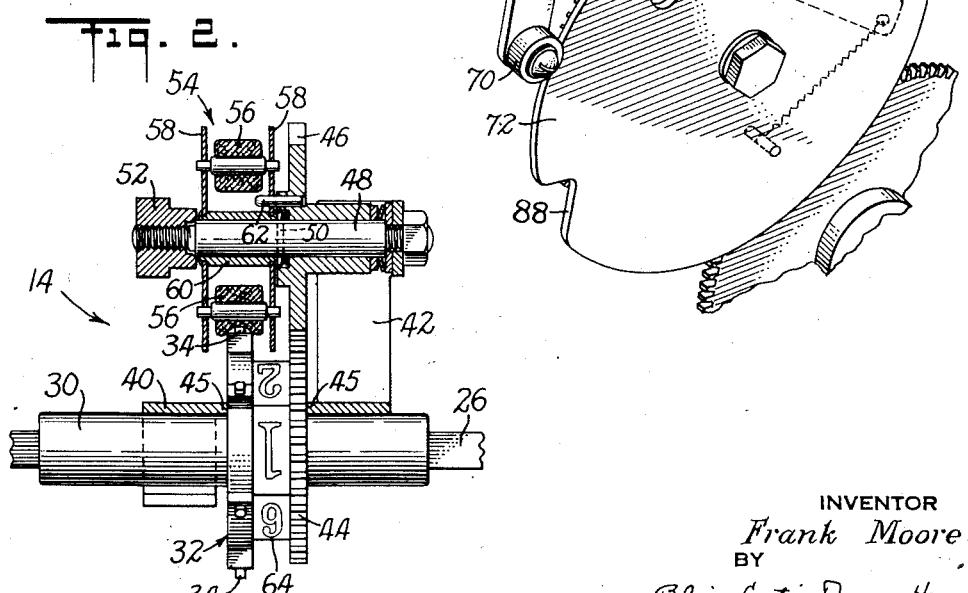

2,191,673

UNITED STATES PATENT OFFICE

2,191,673

PRINTING MECHANISM FOR MULTIPLE-RECORD RECORDERS

Frank Moore, Foxboro, Mass., assignor to The Foxboro Company, Foxboro, Mass., a corporation of Massachusetts Original application March 6, 1935, Serial No. 9,655. Divided and this application August 10, 1937, Serial No. 158,301

3 Claims. (Cl. 234—66)

This invention relates to printing apparatus for multiple-record recorders as, for example, multiple-record pyrometer recorders.

This application is a division of my co-pending application Serial No. 9655, filed March 6, 1935.

One of the objects of the invention is to provide improved recording or printing apparatus.

In the accompanying drawing in which is shown one embodiment of the invention,

Fig. 1 is a perspective view of the printing apparatus as applied to a multiple-record pyrometer; and, Fig. 2 is a vertical sectional view taken on line 2—2 of Fig. 1.

Corresponding reference characters refer to corresponding parts throughout the several views of the drawing.

A multiple-record pyrometer records on a single chart a plurality of individual records of a plurality of different conditions. For example, a six-record temperature recorder would make six records on a single chart of the temperatures of six different thermocouples measuring different conditions. The recording apparatus is successively connected with the different thermocouples and the printing mechanism, and during each connection prints a mark on the chart indicative of the then-existing value of the thermocouple with which it is connected. To make the different records distinguishable, since they may cross one another on the chart, it is desirable to have each record printed in a distinguishing mark or a distinguishing color or both, and apparatus embodying the present invention makes such distinguishable records.

Referring to Fig. 1, a strip chart 10 of a potentiometer type of multiple-record pyrometer, continually passes over a suitable feed roll 12. Printing mechanism, generally indicated at 14, is mounted over the chart and feed roll for slidable movement crosswise of the chart. The printing mechanism is periodically brought into contact with the chart to print a record. The printing mechanism is thus moved over the chart by means of a slider generally indicated at 16, carrying one resilient contact 18 pressing against a slide wire 20, and another contact 22 pressing against a contact bar 24. The slide wire 20 may be connected, for example, in a potentiometer circuit, and the slider 16 and its contact 18 are automatically adjusted along the slide wire by balancing mechanism (not shown) to balance the potentiometer circuit with, for example, a thermocouple to which the potentiometer circuit is connected. When the potentiometer circuit is balanced, the position of the slider is indicative of the temperature of the thermocouple then connected. Further, the instrument is designed so that after balancing is performed, the printing operation takes place, after which the potentiometer circuit is automatically connected with the next-succeeding thermocouple, and the slider is again moved over the slide wire until the potentiometer circuit is again balanced.

The mechanism for moving the slider and for shifting the potentiometer circuit from one thermocouple to another, is fully disclosed in the above-mentioned co-pending application and is not here shown nor described.

Referring now to the printing mechanism in detail, a square shaft 26 extending above and across the chart is rotatably mounted at its right end in a rocker arm 28, and at its opposite end in a rocker arm 29. Freely slidable along the shaft is a sleeve 30, and secured to the sleeve is a type wheel, generally indicated at 32, provided with six pieces of type 34 shaped to print dots, as shown, but which may be shaped to print numbers, letters or the like. The shaft 26 normally holds the type wheel just above the chart, but is periodically dropped to bring one of the pieces of type 34 into printing contact with the chart. Rotation of the shaft 26 and the consequent rotation of the type wheel 32 shifts the type wheel to present a different type 34 for printing contact.

The type wheel is adjusted along shaft 26, and so adjusted laterally with respect to the chart, by a connecting frame, generally indicated at 36, mechanically connecting the type wheel with the slider 16. Connecting frame 36 is removably connected without lateral play to the slider 16 by means of a pin shaft 38 passing through upturned ears of connecting frame 36 and through suitable bearings in arms 37 extending forwardly from the slider 16 and resiliently pressing against the ears of frame 36. One of the arms 37 may be sprung away from the frame 36 to permit the removal of frame 36 from slider 16 when desired. With this construction, lateral movement of slider 16 is transmitted to the connecting frame 36 without lost motion.

One of two forwardly-extending arms 40 of the frame 36 hooks over sleeve 30 and prevents it from being inadvertently moved out of engagement with the sleeve. The other arm 42 is bent upwardly and supports the inking mechanism for inking each type with a characteristic color. Short lugs 45 (see Fig. 2) extend inwardly from the two arms 40 and 42 to position the type wheel and cause it to follow accurately lateral movements of the frame 36.

The mechanism for inking the type is driven by a gear 44 secured to the type wheel 32. Meshing with this gear is another gear 46 (Fig. 2) mounted on a shaft 48, secured to an ear extending from arm 42. The shaft 48 is provided with a pin 50 which holds the gear 46 against axial movement with respect to the shaft 48. Rotation of the type wheel thus causes rotation of the gear 46. Removably and rotatably mounted on the shaft 48 and held in place by a thumb nut 52, is a circular reel, generally indicated at 54, rotatably supporting six felt inking pads 56 (i. e., a separate pad for each piece of type on wheel 32). The reel comprises spaced parallel discs 58 rigidly mounted on a sleeve 60. The reel is rotated by gear 46 by means of a pin 62 extending laterally from gear 46 and entering a suitable hole in the adjacent disc 58 of the reel 54.

As the type wheel and reel carrying the inking pads are rotated, the type and pads contact with each other. Each type as it leaves its particular inking pad, gives it a slight rotational movement with respect to the supporting discs so that when the pad and type are again brought into inking position, the type contacts the pad at a place removed from where it contacted the pad in the next-preceding inking operation. Each pad may be inked with a different color, so that each type will also be inked with a different color. Indications 64 associated with the type wheel indicate the meaning of the colors.

The type wheel 32 and reel 54 are preferably adjusted with respect to each other to synchronize the position of the type and pads before the gears 44 and 46 are meshed.

Referring to Fig. 1, the mechanism for operating the printing apparatus and the rocker arms 28 and 29 supporting the square shaft 26 are rigidly secured to a sleeve 66 concentrically mounted over a drive shaft 68, suitably rotatably supported by frame work (not shown). The rocker arm 28 extends beyond the square shaft 26 and is doubled upon itself, and the end of the arm carries a cam follower 70 riding on a constantly driven cam 72 driven by suitable means (not shown).

Secured to the left end of square shaft 26 is a gear 74 meshing with a gear 76 secured to the drive shaft 68. The shaft 68 is rotated by a star wheel 78 secured to the right end of the shaft, and provided with six teeth 80. The star wheel is driven in a step-by-step rotation (⅙ of a rotation per step) by a pin 82 carried by cam 72. The pin 82 extends through an arcuate slot in the cam 72 and is mounted on a lever 84 suitably pivoted to the inside of the cam 72, as by a nut and bolt assembly 86. The lever 84 is resiliently held in the position shown in Fig. 1, by a spring (not shown). If for any reason, however, the star wheel gets out of synchronism with cam 72 so that one of the teeth of the star wheel abuts pin 82 instead of slipping between the teeth, the pin 82 and lever 84 move back in the arcuate slot to permit the tooth contacting the pin to pass it. As the cam 72 rotates and periodically rotates the star wheel, it periodically moves the type successively to present above the chart different type.

The type wheel is caused to print at the proper moment by a notch 88 provided in cam 72 and into which notch cam follower 70 drops, simultaneously dropping the type wheel into printing contact with the chart. Immediately thereafter the type is raised from the chart by cam 72.

It is noted that cam 72 is preferably driven in a clockwise manner and that the pin rotating the star wheel is positioned ahead of the notch 88 so that the star wheel rotates the type wheel to change the type just before the rocker arm 28 initiates the printing operation. With this arrangement less time is allowed for the ink to dry on the type wheel, before the printing operation occurs.

The same operation of the star wheel that is used to shift the type may also be used to switch the potentiometer circuit from the last-succeeding thermocouple to the next-succeeding thermocouple.

As many changes could be made in carrying out the above construction without departing from the scope of the invention, it is intended that all matter contained in the above description and shown in the accompanying drawing shall be interpreted as illustrative and not in a limiting sense.

I claim:

1. In apparatus of the class described, in combination, printing mechanism for printing individual records of a plurality of values on a chart, a hub having mounted thereon a plurality of type, one for each value, an inking reel for inking each type with a characteristic color having a plurality of pads, said hub and inking reel being geared together and said type and pads being so positioned with respect to one another that as said hub is rotated each type is inked by a corresponding pad, and means for rotatively mounting each pad so that contact with the type turning about a different axis than the pad causes the pad to rotate to present a fresh surface to the type at the next inking operation.

2. In apparatus for successively recording a plurality of individual records on a chart by means of individual type and printing each record with a characteristic indication, the combination of a type wheel rotatably mounted for movement relative to said chart, pivoted means operable for effecting said relative movement between said wheel and said chart, a reel rotatably mounted on said pivoted means, a plurality of cylindrical inking pads rotatably and circumferentially mounted on said reel, means for synchronously rotating said reel and type wheel to bring the cylindrical pads successively into contact with the type, and the axes of said reel, type wheel and cylindrical pads all being parallel and so displaced from one another that as each type moves into contact with its respective pad it gives the pad rotational movement.

3. In apparatus of the class described, in combination, a pair of supports having parallel axes, a type wheel mounted on one of said supports and having a plurality of circumferentially spaced type, a reel rotatably mounted on the other of said supports and having a plurality of circumferentially arranged inking pads rotatably mounted thereon and successively engageable by said type, and means forming a driving connection between said type wheel and said reel so that upon rotation of the inking wheel said type engages said inking pads, contact therebetween effecting rotation of the inking pads so that a fresh surface of the pad is presented to the type at the next inking operation.

FRANK MOORE.